(12) United States Patent
Makino

(10) Patent No.: US 9,256,213 B2
(45) Date of Patent: Feb. 9, 2016

(54) NUMERICAL CONTROL UNIT HAVING FUNCTION TO SMOOTHLY CHANGE FEED SPEED WHEN OVERRIDE IS CHANGED

(71) Applicant: FANUC Corporation, Minamitsuru-gun, Yamanashi (JP)

(72) Inventor: Iwao Makino, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 59 days.

(21) Appl. No.: 14/301,630

(22) Filed: Jun. 11, 2014

(65) Prior Publication Data
US 2014/0368151 A1  Dec. 18, 2014

(30) Foreign Application Priority Data

Jun. 12, 2013  (JP) .................................. 2013-123558

(51) Int. Cl.
G05B 19/18  (2006.01)
G05B 11/01  (2006.01)

(52) U.S. Cl.
CPC ....................... *G05B 11/01* (2013.01)

(58) Field of Classification Search
CPC ................. G05B 19/4097; G05B 2219/42128; G05B 45/76; B24B 49/10
See application file for complete search history.

(56) References Cited

U.S. PATENT DOCUMENTS

| 6,163,124 A | 12/2000 | Ito et al. |
| 2012/0129433 A1* | 5/2012 | Makiuchi ................ B24B 5/045 451/5 |
| 2013/0123968 A1 | 5/2013 | Nishibashi |

FOREIGN PATENT DOCUMENTS

| JP | H03161239 A | 7/1991 |
| JP | H03172903 A | 7/1991 |
| JP | 11-175130 A | 7/1999 |
| JP | H11202915 A | 7/1999 |
| JP | 2010-009094 A | 1/2010 |
| JP | 2012-032960 A | 2/2012 |

OTHER PUBLICATIONS

Notification for Reasons for Refusal issued Nov. 11, 2014 in Japanese Patent Application No. 2013-123558 (3 pages) with English Translation (3 pages).
Decision to Grant a Patent issued in Japanese Patent Application No. 2013-123558 on Feb. 17, 2015 (3 pages) with English Translation (3 pages).

* cited by examiner

*Primary Examiner* — Karen Masih
(74) *Attorney, Agent, or Firm* — Drinker Biddle & Reath LLP

(57) ABSTRACT

A commanded speed is acquired by a command program analysis unit, an override is acquired by an override input unit, and the override before input is changed in steps by a stepwise override change unit to the override that is input, in a predesignated time or by a predesignated change amount, and outputs the override changed as an actual override. The actual override is acquired by a speed operation unit in an interpolation cycle from the stepwise override change unit and the commanded speed is multiplied by the actual override to calculate a feed speed.

3 Claims, 8 Drawing Sheets

THICK PORTION INDICATES CASE OF HIGH SPEED CYCLE MACHINING

FIG. 1

```
#20001=10    (NUMBER OF TIMES OF REPETITION IS 10 TIMES)
#20002=200   (NUMBER OF PIECES OF DATA IS 200)
  #20003=40000  (START NUMBER OF DISTRIBUTED DATA FOR FIRST        HEADER OF
                 AXIS IS #40000)                                    CYCLE 1
    #20004=50000 (START NUMBER OF DISTRIBUTED DATA FOR SECOND
                  AXIS IS #50000)
      :

#40000=10    (FIRST DISTRIBUTED DATA FOR FIRST AXIS)       DISTRIBUTED DATA
  :                                                         FOR FIRST AXIS OF
#40199=5     (200-TH DISTRIBUTED DATA FOR FIRST AXIS)          CYCLE 1
  :
  :

#50000=20    (FIRST DISTRIBUTED DATA FOR SECOND AXIS)      DISTRIBUTED DATA
  :                                                         FOR SECOND AXIS
#50199=10    (200-TH DISTRIBUTED DATA FOR SECOND AXIS)         OF CYCLE 1
  :
```

FIG. 2

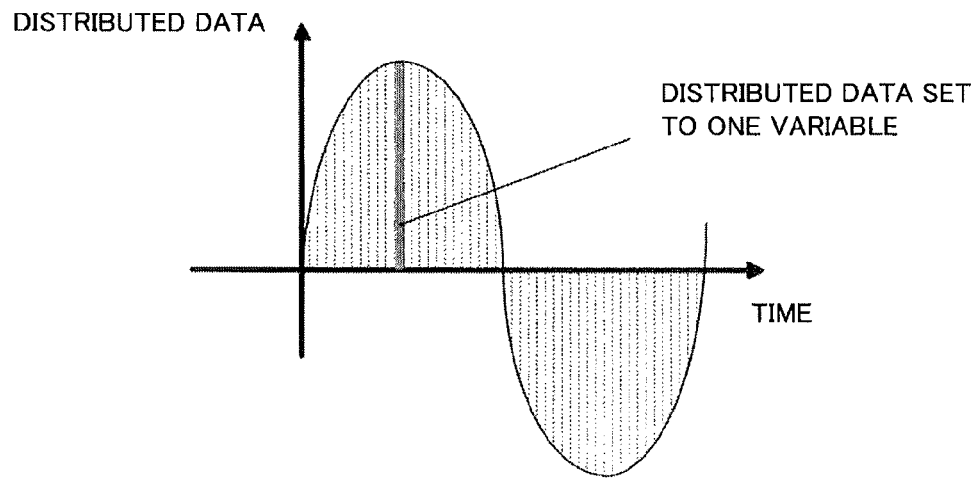

FIG. 5
WHEN HIGH SPEED CYCLE MACHINING DATA IN CONSIDERATION OF ACCELERATION/DECELERATION IS EXECUTED
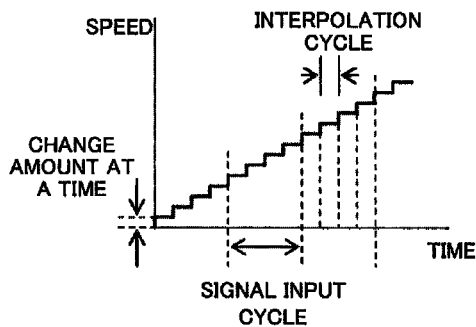
WHEN OVERRIDE IS CHANGED BY TINY AMOUNT EACH TIME
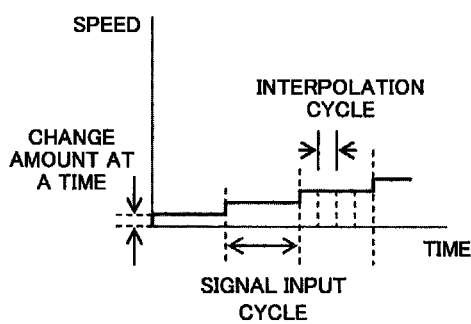
FIG. 6
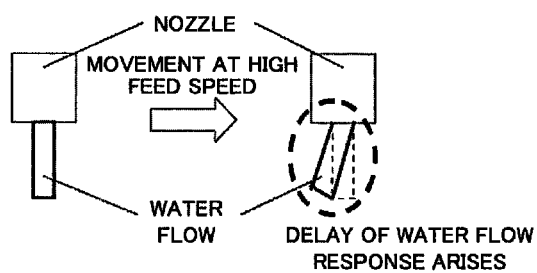

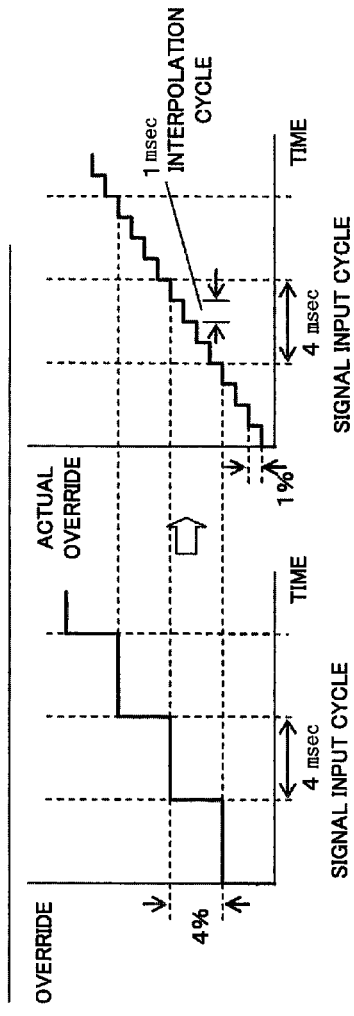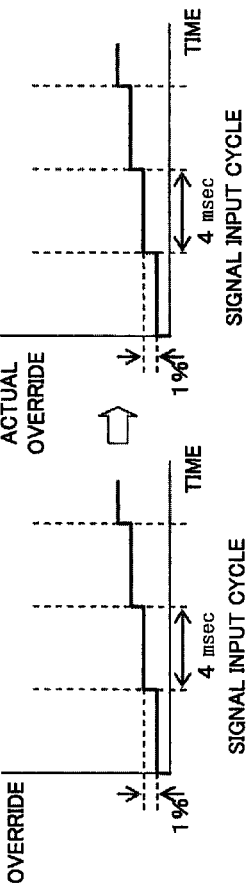

NUMERICAL CONTROL UNIT HAVING
FUNCTION TO SMOOTHLY CHANGE FEED
SPEED WHEN OVERRIDE IS CHANGED

RELATED APPLICATION DATA

This application claims priority under 35 U.S.C. §119 and/or §365 to Japanese Application No. 2013-123558 filed Jun. 12, 2013, the entire contents is incorporated herein by reference.

BACKGROUND OF THE INVENTION

1. Field of the Invention

The present invention relates to a numerical control unit capable of changing the feed speed by an override.

2. Description of the Related Art

JP 2010-9094 A discloses a technology that superimposes the amount of movement of high speed cycle machining that repeatedly performs the same operation and an NC program. The high speed cycle machining is a function capable of executing distributed data stored in a variable area at high speed. High speed cycle machining data stored in the variable area includes a header and distributed data. FIG. 1 illustrates an example of the header and distributed data. FIG. 2 illustrates an example of distributed data concerning an axis.

High speed cycle machining data can be invoked and executed by an NC program command.

As described above, the technology disclosed by JP 2010-9094 A is used, as illustrated in FIG. 3, to superimpose a repeated operation by high speed cycle machining and any operation by an NC program on top of each other. Accordingly, the high speed cycle machining executes high speed cycle machining data for one cycle repeatedly and therefore, the capacity of high speed cycle machining data can be reduced.

However, when a smooth speed change is made to reduce machine shock or a machining error, one of the following two techniques is needed.

(1) Technique to create and execute high speed cycle machining data in consideration of acceleration/deceleration (2) Technique to change an override by a tiny amount each time using a ladder program These are techniques needed to avoid acceleration/deceleration after interpolation so that high speed cycle machining can realize a fast response.

FIG. 4 illustrates an example of high speed cycle machining data in consideration of acceleration/deceleration. While a constant speed portion repeatedly executes high speed cycle machining data for one cycle, an acceleration portion and a deceleration portion need to execute dedicated high speed cycle machining data. If the feed speed is different in a machining process such as rough machining or finishing machining, it is necessary to execute high speed cycle machining data of the acceleration portion/constant speed portion/deceleration portion for each machining process. Therefore, a problem of an increased capacity of high speed cycle machining data and also an increased load of creating high speed cycle machining data is posed.

The override is a function capable of changing the feed speed by specifying a multiplying factor (%) of the commanded speed of a program by an input signal. An actual override to obtain an actual feed speed by multiplying the commanded speed thereby is calculated from the override specified by the input signal and the feed speed is calculated by multiplying the commanded speed by the actual override. When accelerated/decelerated by changing the override, the capacity of high speed cycle machining data can be reduced because high speed cycle machining data for acceleration/deceleration is not needed and also the load of creating high speed cycle machining data can be reduced.

FIG. 5 illustrates an example in which high speed cycle machining data in consideration of acceleration/deceleration is executed and an example in which the override is changed and the feed speed is changed by the same amount each time. The update cycle of override is the signal input cycle, for example, 4 msec and the override is conventionally set directly as the actual override. Accordingly, the cycle in which the actual override changes is longer than the interpolation cycle, for example, 1 msec. Therefore, there is a problem of taking a longer time for acceleration/deceleration when the override is changed compared with a case when high speed cycle machining data in consideration of acceleration/deceleration is used.

A case when the override is changed by a tiny amount each time will be examined. The override is not limited to high speed cycle machining and can also be used for machining by the NC program command. For example, if the feed speed is fast in a water-jet cutting machine, as illustrated in FIG. 6, delay of water flow response arises. In such a case, the override is conventionally updated by a tiny amount each time using a ladder program and the override is directly set as an actual override. Accordingly, the delay of water flow response can be reduced by making a speed such that the change time of speed becomes longer. The speed change using the override can be made independently of acceleration/deceleration after the interpolation and therefore, gradual acceleration/deceleration can be implemented. However, a problem of the load of creating a ladder program is posed.

JP 2012-32960 A discloses a technology that, when a special command to make a speed change such as an emergency stop or an override is input, changes the length of the set unit time to a length in accordance with a speed change of a moving target instructed by the special command to calculate the amount of movement per set unit time after the change. However, the technology disclosed by JP 2012-32960 A is a technology that recalculates the amount of movement by a simple technique after a special command to make a speed change is input to enhance responsiveness of the operation thereof. The technology cannot be applied when a gradual speed change is made by changing the override by a tiny amount each time.

SUMMARY OF THE INVENTION

In view of the problems of the conventional technology, an object of the present invention is to realize gradual acceleration/deceleration in a short time in a speed change using an override and to realize a technique that changes the override by a tiny amount each time.

A numerical control unit according to the present invention is a numerical control unit to control a machine tool that machines work mounted on a table by relatively moving a tool at a feed speed instructed by a machining program, the numerical control unit including a command program analysis unit configured to analyze a commanded speed of the machining program, an override input unit configured to input an override as a multiplying factor of the commanded speed, a stepwise override change unit configured to output the override as an actual override after stepwise changing the override before input by the override input unit up to the override that is input by a predetermined amount for each interpolation cycle, and a speed operation unit configured to calculate the feed speed by multiplying the commanded speed by the actual override.

The numerical control unit may include a specifying unit configured to specify a time in which the override before the input by the override input unit is changed up to the override that is input, wherein the stepwise override change unit may determine an increment or a decrement for the one interpolation cycle such that the override changes stepwise within the time specified and output the actual override.

Alternatively, the numerical control unit may include a specifying unit configured to specify a change amount of the override by the stepwise override change unit for the one interpolation cycle, wherein the stepwise override change unit may output the actual override after stepwise changing the override before the input by the override input unit up to the override that is input by the change amount specified.

By including the above configuration, the present invention can realize gradual acceleration/deceleration in a short time in a speed change using an override and also realize a technique that changes the override by a tiny amount each time.

BRIEF DESCRIPTION OF THE DRAWINGS

The above object and other objects and features of the present invention will be apparent from the following description of embodiments with reference to appended drawings.

FIG. 1 is a diagram illustrating an example of highspeed cycle machining data;

FIG. 2 is an exemplary diagram of distributed data concerning some axis of the high speed cycle machining data;

FIG. 5 is a diagram illustrating acceleration/deceleration in the high speed cycle machining;

FIG. 6 is a diagram illustrating a water-jet cutting machine;

FIG. 7A, FIG. 7B are diagrams illustrating an override and an actual override;

DETAILED DESCRIPTION OF THE PREFERRED EMBODIMENTS

In a first embodiment, an actual override is updated in each interpolation cycle.

The cycle in which the actual override is changed by an override is conventionally the signal input cycle, for example, 4 msec, which is longer than the interpolation cycle, for example, 1 msec. In the present embodiment, the actual override is calculated in the interpolation cycle and also the actual override is finely changed. Accordingly, the time needed when the override is changed by a tiny amount using a ladder program can be reduced.

The following two methods are known to finely change the actual override.

The first method is a method of changing the actual override at times specified in advance, which is described in a second embodiment.

The other method is a method of changing the actual override by a change amount of the override specified in advance, which is described in a third embodiment.

FIG. 7A, FIG. 7B illustrate an example in which an input cycle CYCs of signal is 4 msec, an interpolation cycle CYCp is 1 msec, and the amount by which an actual override is changed in one interpolation cycle is 1%. Conventionally, the actual override changes in the input cycle CYCs of signal and therefore, the time needed to change the actual override by 1% is 4 msec and the amount by which the override can be changed in the signal input cycle is 1%. In the present embodiment, an actual override OVRp changes in the interpolation cycle CYCp and therefore, the time needed to change the actual override by 1% is 1 msec and the amount by which the override can be changed in the signal input cycle is 4%.

Figure 3:
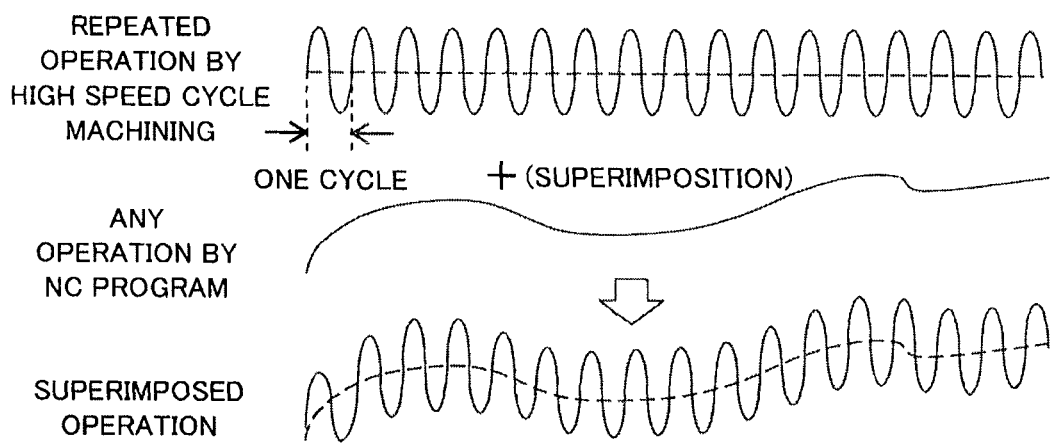
FIG. 3 is a diagram illustrating a technology that superimposes a repeated operation by high speed cycle machining and any operation by an NC program on top of each other.
Figure 4:
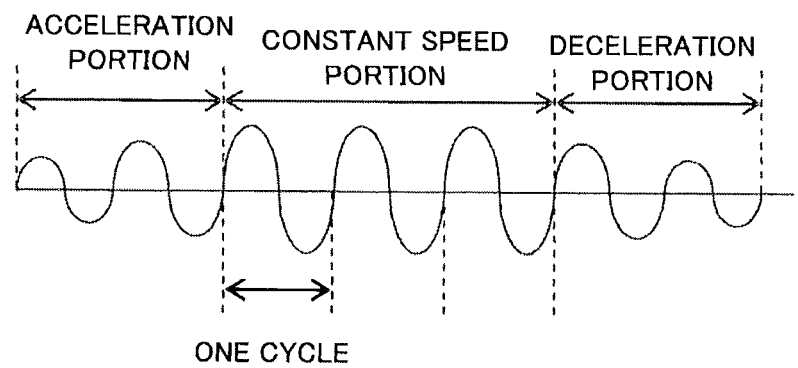
FIG. 4 is a diagram illustrating high speed cycle machining data in consideration of acceleration/deceleration.
Figure 8A:
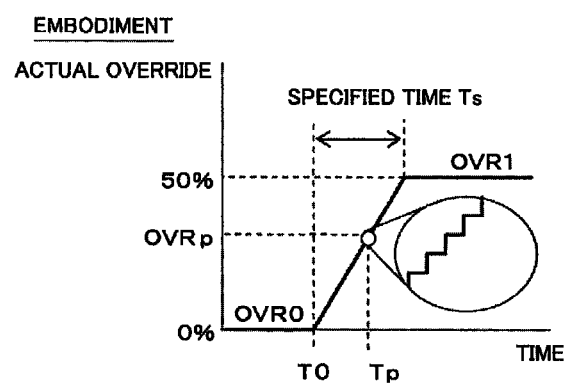
FIG. 8A, FIG. 8B are diagrams illustrating an actual override change in a time specified in advance.
Figure 8B:
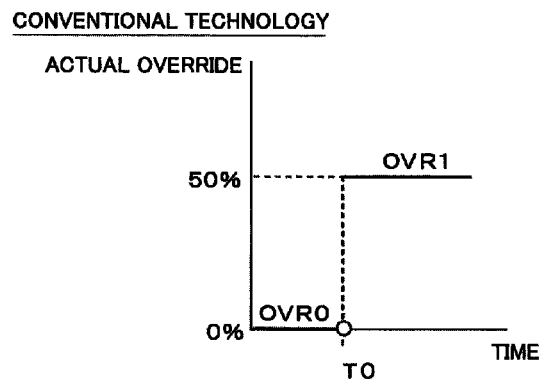

In the second embodiment illustrated in FIG. 8A, FIG. 8B, the actual override changes at times specified in advance.

When, for example, the override changes at time T0 from 0%, that is, OVR0 to 50%, that is, OVR1, the actual override conventionally changes to 50%, that is, OVR1 at a time. In the present embodiment, the actual override OVRp is changed in each interpolation cycle such that 50%, that is, OVR1 is stepwise reached in a time Ts specified in advance.

Within a time of the time Ts specified in advance, the actual override OVRp at time Tp of some interpolation cycle is given by Formula (1), where the actual override changes in the interpolation cycle.

$$OVRp = OVR0 + \frac{Tp - T0}{Ts}(OVR1 - OVR0) \quad (1)$$

wherein if the change from OVR0 to OVR1 is an increase, the maximum value of OVRp is OVR1 and if the change from OVR0 to OVR1 is a decrease, the minimum value of OVRp is OVR1.

Figure 9A:
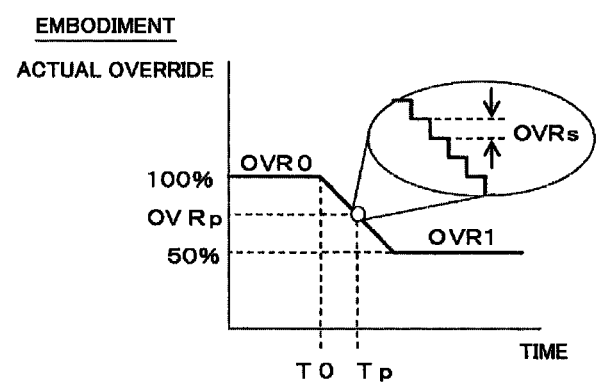
FIG. 9A, FIG. 9B are diagrams illustrating the actual override change by a change amount of the override specified in advance each time.
Figure 9B:
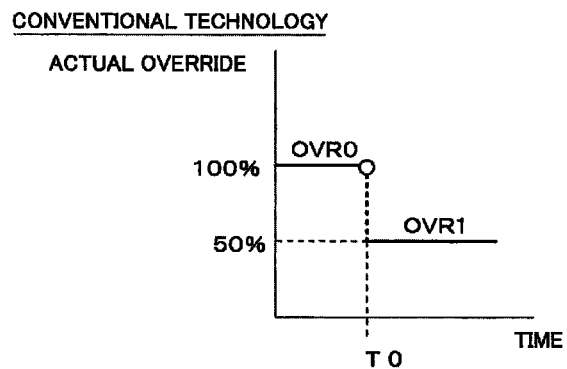

In the third embodiment illustrated in FIG. 9A, FIG. 9B, the actual override changes by a change amount specified in advance.

When, for example, the override changes at time T0 from 100%, that is, OVR0 to 50%, that is, OVR1, the actual override conventionally changes to 50%, that is, OVR1 at a time.

In the present embodiment, the actual override OVRp is changed in each interpolation cycle such that 50%, that is, OVR1 is stepwise reached by a change amount OVRs of the override specified in advance. The actual override OVRp at time Tp of some interpolation cycle is given by Formula (2), where the actual override changes in the interpolation cycle.

$$OVRp = OVR0 + OVRs \times (Tp - T0) \times Fs \quad (2)$$

wherein, if the change from OVR0 to OVR1 is an increase, Fs is 1 and if the change from OVR0 to OVR1 is a decrease, Fs is −1, and if the change from OVR0 to OVR1 is an increase, the maximum value of OVRp is OVR1 and if the change from OVR0 to OVR1 is a decrease, the minimum value of OVRp is OVR1.

Figure 10:
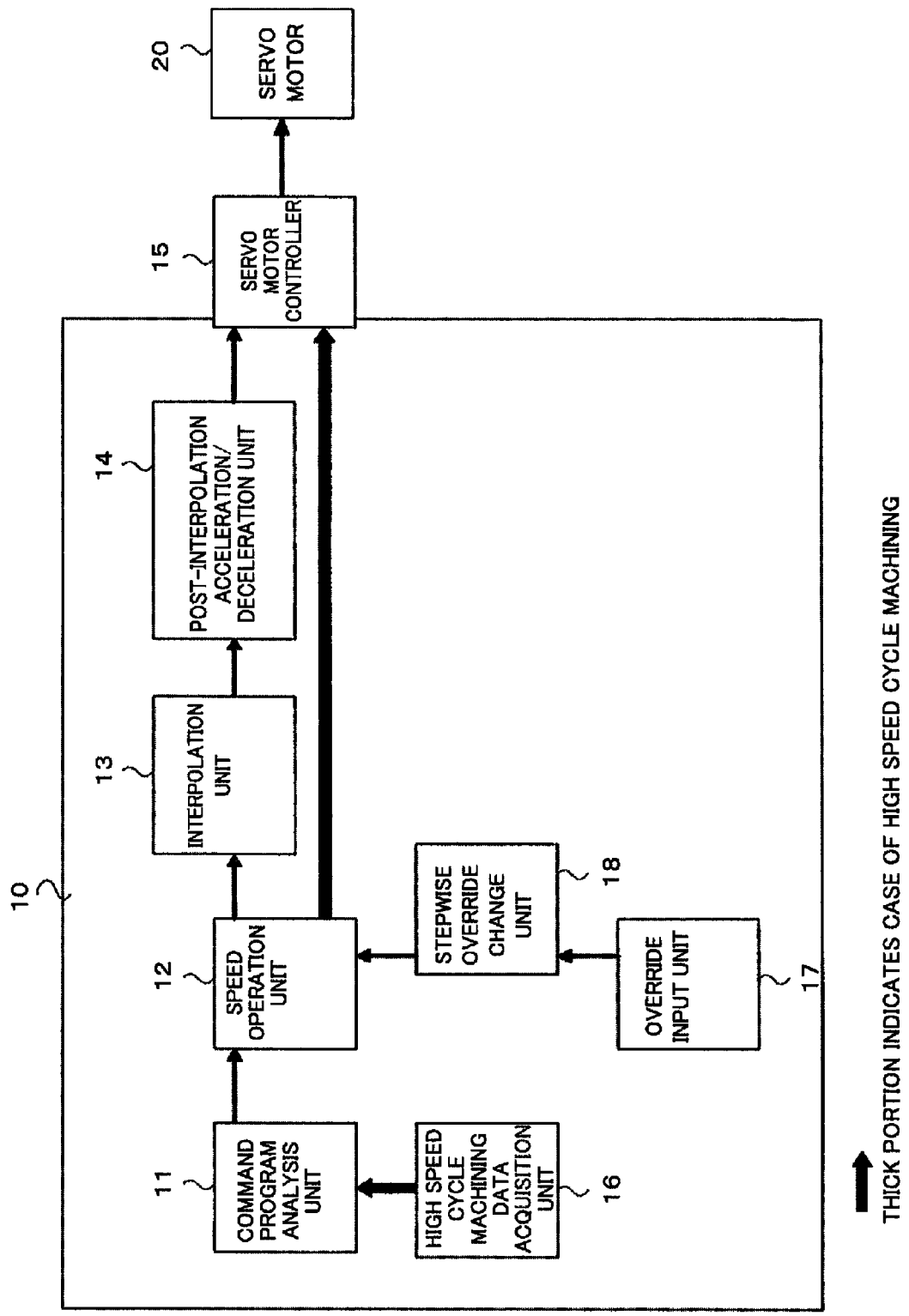
FIG. 10 is a schematic block diagram illustrating a numerical control unit according to an embodiment of the present invention.

FIG. 10 illustrates a numerical control unit. In the case of machining by an NC program command, a numerical control unit 10 analyzes the program by a command program analysis unit 11 to acquire the commanded speed. Next, numerical control unit 10 operates the feed speed for each interpolation cycle by a speed operation unit 12 and performs interpolation by an interpolation unit 13 based on the feed speed to implement acceleration/deceleration by an acceleration/deceleration after interpolation unit 14. Then, the numerical control unit 10 drives a servo motor 20 via a servo motor controller 15 to relatively move work and tools.

In the case of high speed cycle machining, as indicated by a thick arrow in FIG. 10, the numerical control unit 10 acquires high speed cycle machining data by the command program analysis unit 11 from a high speed cycle machining data acquisition unit 16. Next, the numerical control unit 10 operates the feed speed by the speed operation unit 12, multiplies the high speed cycle machining data by the feed speed, and outputs the product to the servo motor controller 15 that drives and controls the servo motor 20 without the aid of the interpolation unit 13 and the acceleration/deceleration after interpolation unit 14. Work and tools are thereby moved relatively.

Conventionally, the commanded speed is acquired by the command program analysis unit 11 and an override is acquired by an override input unit 17. Then, the override is directly set as an actual override by the speed operation unit 12 in the signal input cycle and the commanded speed and the actual override are multiplied in the interpolation cycle to calculate the feed speed.

In the present embodiment, by contrast, the commanded speed is acquired by the command program analysis unit 11 and the override is acquired by the override input unit 17. Next, the override is changed in steps by a stepwise override change unit 18 from the override before input to the input override at times specified in advance or by the change amount of override specified in advance to output the changed override as the actual override. Then, the actual override of the stepwise override change unit 18 is acquired by the speed operation unit 12 in the interpolation cycle to calculate the feed speed by multiplying the commanded speed by the actual override. The stepwise override change unit 18 in the present embodiment belongs to the speed operation unit 12.

Figure 11:
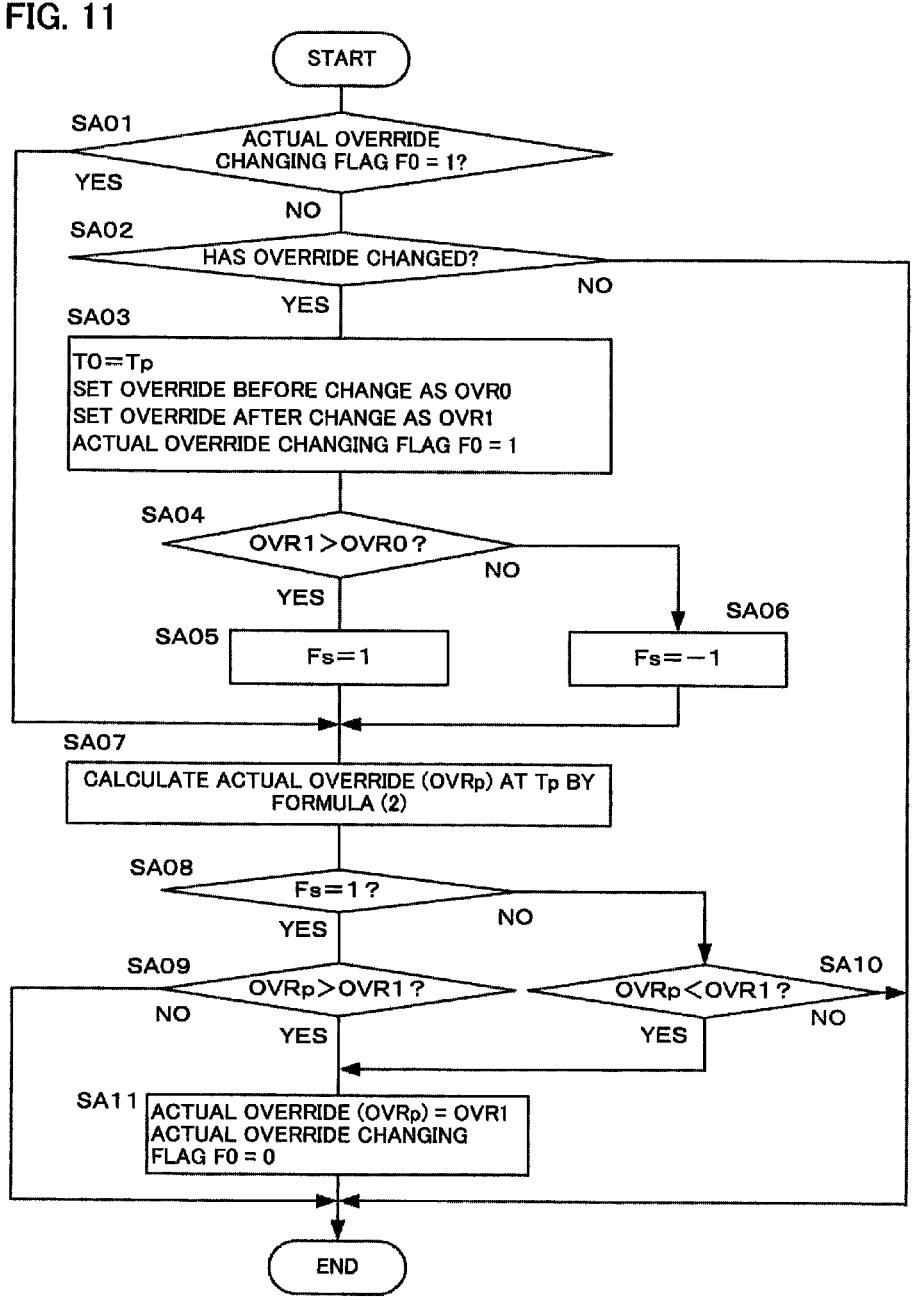
FIG. 11 is a diagram illustrating a flow chart of a stepwise override change unit.

FIG. 11 illustrates a flow chart of the stepwise override change unit. In the numerical control unit according to an embodiment of the present invention illustrated in FIG. 10, the present processing is invoked by the speed operation unit 12 in the interpolation cycle. Conditions when the present processing is performed are as follows.

(1) An actual override changing flag is F0. The initial state thereof is set as F0=0.
(2) The time of the interpolation cycle when the present processing is invoked is Tp.
(3) When the override changes from OVR0 to OVR1 at time T0, the actual override OVRp is changed in steps by the change amount OVRs of the override specified in advance each time by the stepwise override change unit.
(4) Whether the change from OVR0 to OVR1 is an increase or a decrease is indicated by Fs. Fs=1 while increasing and Fs=−1 while decreasing.

Each step is as shown below.

[Step SA01] Determine whether the actual override changing flag F0 is 1 and if the actual override is being changed and the actual override changing flag F0 is 1 (YES), proceed to Step SA07 and otherwise (NO), proceed to Step SA02.

[Step SA02] Determine whether the override has changed and if the override has changed (YES), proceed to Step SA03 and if the override has not changed (NO), terminate the processing. Incidentally, whether the override has changed is determined by comparing the override acquired by the override input unit with the last override.

[Step SA03] Set Tp to T0. Set the override before being changed as OVR0. Set the override after being changed as OVR1. Set the actual override changing flag F0 to 1.

[Step SA04] Determine whether OVR1 is larger than OVR0 and if OVR1 is larger than OVR0 (YES), proceed to Step SA05 and if OVR1 is not larger than OVR0 (NO), proceed to Step SA06.

[Step SA05] Set Fs to 1 and proceed to Step SA07.

[Step SA06] Set Fs to −1 and proceed to Step SA07.

[Step SA07] Calculate the actual override OVRp at Tp according to Formula (2).

[Step SA08] Determine whether Fs is 1 and if Fs=1 (YES), proceed to Step SA09 and if Fs=−1 (NO), proceed to Step SA10.

[Step SA09] Determine whether the actual override OVRp is larger than the maximum value OVR1 and if the actual override OVRp is larger than the maximum value OVR1 (YES), proceed to Step SA11 and if the actual override OVRp is not larger than the maximum value OVR1 (NO), terminate the processing of the cycle. That is, in this step, whether to terminate the change of the actual override is determined.

[Step SA10] Determine whether the actual override OVRp is smaller than the minimum value OVR1 and if the actual override OVRp is smaller than the minimum value OVR1 (YES), proceed to Step SA11 and if the actual override OVRp is not smaller than the minimum value OVR1 (NO), terminate the processing. That is, in this step, whether to terminate the change of the actual override is determined.

[Step SA11] Set the actual override OVRp to OVR1 and also set the actual override changing flag F0 to 0 to terminate the processing in the cycle.

The invention claimed is:

1. A numerical control unit to control a machine tool that machines work mounted on a table by relatively moving a tool at a feed speed instructed by a machining program, including a command program analysis unit configured to analyze a commanded speed of the machining program, a speed operation unit configured to operate a feed speed for each interpolation cycle based on the commanded speed, an interpolation unit configured to perform interpolation based on the feed speed, an acceleration/deceleration after interpolation unit configured to implement acceleration/deceleration to an output from the interpolation unit, a servo motor controller configured to drive a servo motor based on an output from the acceleration/deceleration after interpolation unit, the numerical control unit comprising:

a high speed cycle machining data acquisition unit configured to acquire high speed cycle machining data;

an override input unit configured to input an override as a multiplying factor of the commanded speed; and a stepwise override change unit configured to output the override as an actual override after changing in steps the override before input by the override input unit to the override that is input by a predetermined amount for each interpolation cycle; wherein the command program analysis unit is configured to acquire high speed cycle machining data from a high speed cycle machining data acquisition unit;

the speed operation unit is configured to calculate the feed speed by multiplying the commanded speed by the actual override, and multiply the high speed cycle machining data acquired by the high speed cycle machining data acquisition unit by the feed speed; and the numerical control unit is configured to output the high speed cycle machining data multiplied by the feed speed to the servo motor controller that drives and controls the servo motor, without using the interpolation unit and the acceleration/deceleration after interpolation unit.

2. The numerical control unit according to claim 1, further comprising:

a specifying unit configured to specify a time in which the override before the input by the override input unit is changed to the override that is input, and the stepwise override change unit configured to determine an increment or a decrement in the each interpolation cycle such that the override changes stepwise within the time specified and outputs the actual override.

3. The numerical control unit according to claim 1, further comprising:

a specifying unit configured to specify a change amount of the override by the override change unit for the each interpolation cycle, and the stepwise override change unit configured to output the actual override after changing in steps the override before the input by the override input unit up to the override that is input by the change amount specified.

* * * * *